US007361247B2

(12) United States Patent
Kronzer

(10) Patent No.: US 7,361,247 B2
(45) Date of Patent: Apr. 22, 2008

(54) MATCHED HEAT TRANSFER MATERIALS AND METHOD OF USE THEREOF

(75) Inventor: Francis Joseph Kronzer, Woodstock, GA (US)

(73) Assignee: Neenah Paper Inc., Alpharetta, GA (US)

( * ) Notice: Subject to any disclaimer, the term of this patent is extended or adjusted under 35 U.S.C. 154(b) by 0 days.

(21) Appl. No.: 10/749,687

(22) Filed: Dec. 31, 2003

(65) Prior Publication Data

US 2005/0145325 A1 Jul. 7, 2005

(51) Int. Cl.
*B44C 1/165* (2006.01)
*B44C 1/17* (2006.01)
*B29C 65/02* (2006.01)
*B32B 37/04* (2006.01)
*B32B 38/14* (2006.01)

(52) U.S. Cl. ...................... 156/230; 156/235; 156/240; 156/247; 156/277; 156/289

(58) Field of Classification Search ................ 156/230, 156/234, 235, 237–240, 247, 249, 277, 278, 156/289, 297–300, 308.2, 309.6, 323, 344
See application file for complete search history.

(56) References Cited

U.S. PATENT DOCUMENTS 1,858,673 A 5/1932 Lawrence
3,359,127 A 12/1967 Meyer et al.
3,616,176 A 10/1971 Jackimowicz
3,790,439 A 2/1974 LaPerre et al.
3,872,040 A 3/1975 Mollohan et al.
3,922,435 A 11/1975 Asnes
4,021,591 A 5/1977 DeVries et al.
4,107,365 A 8/1978 Reed et al.

(Continued)

FOREIGN PATENT DOCUMENTS

DE 2842139 A1 4/1979

(Continued)

OTHER PUBLICATIONS

ASTM Designation: E-28-99, "Standard Test Methods for Softening Point of Resins Derived from Naval Stores by Ring-and-Ball Apparatus", Dec. 1999, pp. 1-6.

(Continued)

*Primary Examiner*—Philip Tucker
*Assistant Examiner*—Sing P. Chan
(74) *Attorney, Agent, or Firm*—Dority & Manning, P.A.

(57) ABSTRACT

A heat transfer material kit is disclosed that includes a first heat transfer material that includes a printable, peelable transfer film, and a second, different heat transfer material that includes an overlay transfer film. A method of using the kit is disclosed that includes the steps of a) imaging the printable, peelable transfer film of the first heat transfer material, b) separating the imaged printable, peelable transfer film from the first heat transfer material, c) positioning the second heat transfer material and the imaged printable, peelable transfer film adjacent a substrate, and d) transferring the imaged printable, peelable transfer film and the overlay transfer film to the substrate. Alternate methods of using the kit are also disclosed. Images transferred using the overlay transfer film provide good image appearance and durability.

43 Claims, 3 Drawing Sheets

U.S. PATENT DOCUMENTS 4,167,414 A 9/1979 Morgan
4,224,358 A 9/1980 Hare
4,235,657 A 11/1980 Greenman et al.
4,240,807 A 12/1980 Kronzer
4,303,717 A 12/1981 Andrews
4,322,467 A 3/1982 Heimbach et al.
4,351,871 A 9/1982 Lewis et al.
4,383,878 A 5/1983 Young et al.
4,399,209 A 8/1983 Sanders et al.
4,496,618 A 1/1985 Pernicano
4,517,237 A 5/1985 Pernicano
4,536,434 A 8/1985 Magnotta
4,548,857 A 10/1985 Galante
RE32,039 E * 11/1985 Hollister et al. .............. 430/14
4,664,735 A 5/1987 Pernicano
4,757,047 A 7/1988 Kosaka
4,758,952 A 7/1988 Harris, Jr. et al.
4,773,953 A 9/1988 Hare
4,775,657 A 10/1988 Harrison et al.
4,786,349 A 11/1988 Mahn, Sr.
4,863,781 A 9/1989 Kronzer
4,929,501 A 5/1990 Okada et al.
4,966,815 A 10/1990 Hare
4,980,224 A 12/1990 Hare
5,006,502 A 4/1991 Fujimura et al.
5,019,475 A 5/1991 Higashiyama et al.
5,028,028 A 7/1991 Yamada et al.
5,053,267 A 10/1991 Ide et al.
5,059,580 A 10/1991 Shibata et al.
5,064,743 A 11/1991 Koshizuka et al.
5,087,527 A 2/1992 Shimura et al.
5,110,389 A 5/1992 Hiyoshi et al.
5,132,277 A 7/1992 Kaszczuk et al.
5,139,917 A 8/1992 Hare
5,141,915 A 8/1992 Roenigk et al.
5,147,489 A 9/1992 Scrutton et al.
5,151,326 A 9/1992 Matsuda et al.
5,236,801 A 8/1993 Hare
5,242,739 A 9/1993 Kronzer et al.
5,248,543 A 9/1993 Yamaguchi et al.
5,252,531 A 10/1993 Yasuda et al.
5,252,533 A 10/1993 Yasuda et al.
5,263,781 A 11/1993 Mima et al.
5,264,279 A 11/1993 Imamura et al.
5,271,990 A 12/1993 Kronzer et al.
5,286,521 A 2/1994 Matsuda et al.
5,310,589 A 5/1994 Nagashima
5,318,943 A 6/1994 Ueno et al.
5,332,713 A 7/1994 Oldfield et al.
5,334,439 A 8/1994 Kawaguchi et al.
5,338,603 A 8/1994 Mahn, Sr. et al.
5,342,739 A 8/1994 Katou et al.
5,356,853 A 10/1994 Ueno et al.
5,362,703 A 11/1994 Kawasaki et al.
5,366,251 A 11/1994 Brandt et al.
5,372,987 A 12/1994 Fisch et al.
5,372,988 A 12/1994 Takeuchi et al.
5,387,574 A 2/1995 Campbell et al.
5,407,724 A 4/1995 Mimura et al.
5,413,841 A 5/1995 Mahn, Sr. et al.
5,419,944 A 5/1995 Sammis
5,427,997 A 6/1995 Oshima et al.
5,431,501 A 7/1995 Hale et al.
5,432,258 A 7/1995 Yoshimura
5,444,037 A 8/1995 Imai et al.
5,484,644 A 1/1996 Imamura et al.
5,501,902 A 3/1996 Kronzer
5,508,105 A 4/1996 Orensteen et al.
5,571,766 A 11/1996 Imai et al.
5,614,345 A 3/1997 Gumbiowski et al.
5,616,155 A 4/1997 Kronzer
5,647,935 A 7/1997 Hoshino et al.
5,654,080 A 8/1997 Hayashi et al.
5,660,928 A 8/1997 Stokes et al.
5,670,448 A 9/1997 Kometani
5,677,049 A 10/1997 Torii
5,707,925 A 1/1998 Akada et al.
5,716,477 A 2/1998 Yamaguchi et al.
5,716,900 A 2/1998 Kronzer et al.
5,770,268 A 6/1998 Kuo et al.
5,776,854 A 7/1998 Hayashi
5,789,134 A 8/1998 Brault et al.
5,798,179 A 8/1998 Kronzer
5,846,367 A 12/1998 Omote et al.
5,861,355 A 1/1999 Olson et al.
5,876,836 A 3/1999 Imamura et al.
5,879,813 A 3/1999 Tanaka et al.
5,880,065 A 3/1999 Hayashi et al.
5,885,928 A 3/1999 Hirano et al.
5,891,824 A 4/1999 Simpson et al.
5,895,557 A 4/1999 Kronzer
5,897,735 A 4/1999 Peskin
5,898,018 A 4/1999 Hirano et al.
5,925,712 A 7/1999 Kronzer
5,942,335 A 8/1999 Chen et al.
5,945,375 A 8/1999 Kronzer
5,948,586 A 9/1999 Hare
5,962,149 A 10/1999 Kronzer
5,981,045 A 11/1999 Kuwabara et al.
5,981,077 A 11/1999 Taniguchi
6,017,636 A 1/2000 Tada et al.
6,020,397 A 2/2000 Matzinger
6,033,739 A 3/2000 Kronzer
6,043,194 A 3/2000 Saito et al.
6,054,223 A 4/2000 Tsuchiya et al.
6,066,387 A 5/2000 Ueda et al.
6,071,368 A 6/2000 Boyd et al.
6,083,656 A 7/2000 Hare et al.
6,083,872 A 7/2000 Adkins
6,087,061 A 7/2000 Hare et al.
6,096,475 A 8/2000 Hare et al.
6,103,364 A 8/2000 Harris et al.
6,113,725 A 9/2000 Kronzer
6,139,672 A 10/2000 Sato et al.
6,177,187 B1 1/2001 Niemoller et al.
6,180,219 B1 1/2001 Hoshino et al.
6,200,668 B1 3/2001 Kronzer
6,210,794 B1 4/2001 Nakamura
6,214,149 B1 4/2001 Nakano et al.
6,232,267 B1 5/2001 Oshima et al.
6,232,268 B1 5/2001 Narita et al.
6,245,710 B1 6/2001 Hare et al.
6,251,824 B1 6/2001 Ueno et al.
6,265,053 B1 7/2001 Kronzer et al.
6,277,229 B1 8/2001 Popat et al.
6,281,166 B1 8/2001 Kronzer
6,290,798 B1 9/2001 Onishi et al.
6,294,307 B1 9/2001 Hare et al.
6,309,495 B1 10/2001 Lakes
6,335,307 B1 1/2002 Imai et al.
6,346,313 B1 2/2002 Cook
6,350,508 B1 2/2002 Ueno et al.
6,358,600 B1 3/2002 Hayashi et al.
6,358,660 B1 3/2002 Agler et al.
6,383,710 B2 5/2002 Hare et al.
6,395,375 B1 5/2002 Imamura et al.
6,410,200 B1 6/2002 Williams et al.
6,423,466 B2 7/2002 Hare et al.
6,428,878 B1 8/2002 Kronzer
6,432,549 B1 8/2002 Kronzer
6,450,633 B1 9/2002 Kronzer
6,465,393 B1 10/2002 Nakano et al.
6,482,285 B2 11/2002 Cross
6,497,781 B1 12/2002 Dalvey et al.

| | | | | |
|---|---|---|---|---|
| 6,509,131 | B2 | 1/2003 | Hare et al. | |
| 6,531,216 | B1 | 3/2003 | Williams et al. | |
| 6,551,692 | B1 | 4/2003 | Dalvey et al. | |
| 6,582,803 | B2 | 6/2003 | Cole et al. | |
| 6,593,406 | B2 | 7/2003 | Sargeant et al. | |
| 6,613,412 | B1 | 9/2003 | Dressler | |
| 2002/0081420 | A1 | 6/2002 | Kronzer | |
| 2002/0102391 | A1 | 8/2002 | Kronzer | |
| 2002/0146544 | A1* | 10/2002 | Kronzer | 428/195 |
| 2002/0153110 | A1 | 10/2002 | Yamaguchi et al. | |
| 2003/0008116 | A1 | 1/2003 | Williams et al. | |
| 2003/0021962 | A1 | 1/2003 | Mukherjee et al. | |

FOREIGN PATENT DOCUMENTS

| | | | |
|---|---|---|---|
| EP | 0241212 | A2 | 10/1987 |
| EP | 0241212 | A3 | 10/1987 |
| EP | 0266094 | A1 | 5/1988 |
| EP | 0466503 | A1 | 1/1992 |
| EP | 0659579 | A2 | 6/1995 |
| EP | 0 652 114 | B1 | 1/1998 |
| EP | 0842786 | A1 | 5/1998 |
| EP | 0933226 | A2 | 8/1999 |
| EP | 0 850 786 | B1 | 3/2002 |
| EP | 1 219 460 | A2 | 7/2002 |
| EP | 1 232 874 | A1 | 8/2002 |
| EP | 1 020 299 | B1 | 4/2003 |
| EP | 1 316 435 | A1 | 6/2003 |
| EP | 1 340 626 | A1 | 9/2003 |
| EP | 1 344 653 | A1 | 9/2003 |
| FR | 2 442 721 | A | 8/1980 |
| GB | 1487599 | | 10/1977 |
| GB | 2084931 | A | 4/1982 |
| GB | 2147614 | A | 5/1985 |
| GB | 2243332 | A | 10/1991 |
| JP | 01208192 | A | 8/1989 |
| JP | 03010879 | A | 1/1991 |
| JP | 6-155995 | A | 6/1994 |
| JP | 06312573 | A | 11/1994 |
| JP | 2002-079767 | A | 3/2002 |
| WO | WO 87/04393 | | 7/1987 |
| WO | WO 90/00473 | | 1/1990 |
| WO | WO 91/06433 | | 5/1991 |
| WO | WO 9114207 | A1 | 9/1991 |
| WO | WO 92/22857 | | 12/1992 |
| WO | WO 93/21561 | | 10/1993 |
| WO | WO 95/08419 | | 3/1995 |
| WO | WO 96/10491 | | 4/1996 |
| WO | WO 97/01448 | | 1/1997 |
| WO | WO 97/33763 | | 9/1997 |
| WO | WO 98/43821 | | 10/1998 |
| WO | WO 99/25917 | | 5/1999 |
| WO | WO 00/59733 | | 10/2000 |
| WO | WO 00/64685 | | 11/2000 |
| WO | WO 00/73570 | | 12/2000 |
| WO | WO 01/03941 | | 1/2001 |
| WO | WO 01/12448 | | 2/2001 |
| WO | WO 01/17792 | | 3/2001 |
| WO | WO 01/23664 | | 4/2001 |
| WO | WO 01/62514 | | 8/2001 |
| WO | WO 02/36353 | | 5/2002 |
| WO | WO 02/055311 | | 7/2002 |
| WO | WO 03/006736 | | 1/2003 |
| WO | WO 03066337 | A2 | 8/2003 |
| WO | WO 03066337 | A3 | 8/2003 |

OTHER PUBLICATIONS

ASTM Designation: D-1238-00, “Standard Test Method for Melt Flow Rates of Thermoplastics by Extrusion Plastometer”, Nov. 2000, pp. 1-12.

Abstract of Japanese Patent No. 2001162932, Jun. 19, 2001.

Search Report and Written Opinion for PCT/US2004/039983, May 9, 2005.

Kronzer, U.S. Appl. No. 11/026,408, filed Dec. 30, 2004, Heat Transfer Masking Sheet Materials And Methods Of Use Thereof.

Search Report and Written Opinion for PCT/US2005/010495, Apr. 18, 2006.

* cited by examiner

MATCHED HEAT TRANSFER MATERIALS AND METHOD OF USE THEREOF

BACKGROUND OF THE INVENTION

In recent years, a significant industry has developed which involves the application of customer-selected designs, messages, illustrations, and the like (referred to collectively hereinafter as "images") on articles of clothing, such as T-shirts, sweat shirts, and the like. These images may be commercially available products tailored for a specific end-use and printed on a release or transfer paper, or the customer may generate the images on a heat transfer paper. The images are transferred to the article of clothing by means of heat and pressure, after which the release or transfer paper is removed.

Heat transfer papers having an enhanced receptivity for images made by wax-based crayons, thermal printer ribbons, ink-jet printers, laser-jet printers, and impact ribbon or dot-matrix printers, are well known in the art. Typically, a heat transfer material includes a cellulosic base sheet and an image-receptive coating on a surface of the base sheet. The image-receptive coating usually contains one or more film-forming polymeric binders, as well as, other additives to improve the transferability and printability of the coating. Other heat transfer materials include a cellulosic base sheet and an image-receptive coating, wherein the image-receptive coating is formed by melt extrusion or by laminating a film to the base sheet. The surface of the coating or film may then be roughened by, for example, passing the coated base sheet through an embossing roll.

Much effort has been directed at generally improving the transferability of an image-bearing laminate (coating) to a substrate. For example, an improved cold-peelable heat transfer material has been described in U.S. Pat. No. 5,798,179, which allows removal of the base sheet immediately after transfer of the image-bearing laminate ("hot peelable heat transfer material") or some time thereafter when the laminate has cooled ("cold peelable heat transfer material"). Moreover, additional effort has been directed to improving the crack resistance and washability of the transferred laminate. The transferred laminate must be able to withstand multiple wash cycles and normal "wear and tear" without cracking or fading.

Various techniques have been used in an attempt to improve the overall quality of the transferred laminate and the article of clothing containing the same. For example, plasticizers and coating additives have been added to coatings of heat transfer materials to improve the crack resistance and washability of image-bearing laminates on articles of clothing.

Heat transfer materials have also been developed that include a transfer film that is peelable from the heat transfer material after imaging of the film but prior to the process of transferring the image to the substrate. Removal of the imaged peelable transfer film prior to adhering the film to the substrate attempts to solve the problem of image reversal that occurs when an imaged heat transfer material is placed image side down against the substrate for transfer of the image to the substrate. It also attempts to solve the problem of how to apply images to dark substrates because it allows an opaque layer to be placed behind the imaged surface of the peelable transfer film. The peelable transfer film allows the imaged film to be placed image side up against the substrate. A protective sheet may be utilized over the imaged film during the application of the heat and pressure used to permanently affix the film to the substrate. However, because the image is on the outside layer of the film, the ink or other medium is susceptible to exposure after the transfer. Exposure of the image medium can result in poor washability and wear characteristics. This may be partially solved by utilizing ink-receptive layers that allow inks to penetrate the film. However, penetration of the inks into the film may result in a decrease in brightness of the transfer, making it appear "chalky", "washed out", or less vivid.

Therefore, there remains a need in the art for heat transfer papers and methods of application that provide good image appearance and durability.

SUMMARY OF THE INVENTION

In accordance with one embodiment of the present invention, a method of applying an image to a substrate is disclosed that includes the steps of:

a) imaging a printable layer of a first heat transfer material including a first base layer and the printable layer to create an imaged printable layer;

b) separating the imaged printable layer from the first base layer;

c) positioning a second heat transfer material, the second heat transfer material including a second base layer and an overlay transfer film, and the imaged printable layer adjacent a substrate;

d) transferring the imaged printable layer and the overlay transfer film to the substrate.

The transferring step may be performed through application of heat and pressure to the second heat transfer material. The application of heat and pressure may be, for example, performed by hand ironing or by using a heat press.

In accordance with another embodiment of the present invention, a method of applying an image to a substrate is disclosed that includes the steps of:

a) imaging a printable layer of a first heat transfer material including a first base layer and the printable layer to create an imaged printable layer;

b) overlaying the imaged printable layer with a second heat transfer material including a second base layer and an overlay transfer film;

c) transferring the imaged printable layer to the first heat transfer material; and d) transferring the imaged printable layer and the overlay transfer film to a substrate.

In accordance with yet another embodiment of the present invention, a method of applying an image to a substrate is disclosed that includes the steps of:

a) positioning an imaged film and a heat transfer material adjacent a substrate, the heat transfer material including an overlay transfer film; and b) transferring the imaged film and the overlay transfer film to the substrate.

In accordance with one embodiment of the present invention, a heat transfer material kit is disclosed that includes a first heat transfer material that includes a printable, peelable transfer film, and a second, different heat transfer material that includes an overlay transfer film. The first and second heat transfer materials may be labeled so as to allow a user to distinguish therebetween. The kit may contain equal numbers of the first and second heat transfer materials, or the kit may contain more of the first heat transfer material than the second heat transfer material. The kit may further include at least one stick-resistant overlay material. The stick-resistant overlay material may be a silicon-coated overlay material. The overlay transfer film may include a polymer that melts in a range of from about 65 degrees Celsius to about 180 degrees Celsius. Further, the overlay transfer film may include a film-forming binder. Even further, the image-receptive transfer film may include a powdered thermoplastic polymer.

In one aspect, the first heat transfer material may further include a base layer, and a release layer overlaying the base layer and underlying the printable, peelable transfer film. The release layer may include, for example, a polymer having essentially no tack at transfer temperatures of about 177 degrees Celsius, a crosslinked polymer, and so forth. Desirably, the release layer may include a polymer selected from the group consisting of acrylic polymers, poly(vinyl acetate), and so forth.

Desirably, the release layer and the printable, peelable transfer film are adapted to provide the first heat transfer material with cold release properties. Such cold-release properties may be imparted by using an effective amount of a release-enhancing additive in the release layer. The release-enhancing additive may include, for example, a divalent metal ion salt of a fatty acid, a polyethylene glycol, a silicone surfactant, a mixture thereof, and so forth. More specifically, the release-enhancing additive may include, for example, calcium stearate, a polyethylene glycol having a molecular weight of from about 2,000 to about 100,000, a siloxane-polyether surfactant, a mixture thereof, and so forth.

In another aspect, the printable, peelable transfer film may further include a printable ink-compatible layer that includes a film-forming binder and a powdered thermoplastic polymer. Each of the film-forming binder and the powdered thermoplastic polymer desirably melts in a range of from about 65 degrees Celsius to about 180 degrees Celsius.

In a further aspect, the second heat transfer material may further include a base layer, and a release layer overlaying the base layer and underlying the overlay transfer film. The release layer may include, for example, a polymer having essentially no tack at transfer temperatures of about 177 degrees Celsius, a crosslinked polymer, and so forth. Desirably, the release layer may include a polymer selected from the group consisting of acrylic polymers, poly(vinyl acetate), and so forth.

Desirably, the release layer and the overlay transfer film are adapted to provide the second heat transfer material with cold release properties. Such cold-release properties may be imparted by using an effective amount of a release-enhancing additive in the release layer as described above for the first heat transfer material.

In yet another aspect, a method of using the kit is disclosed that includes the steps of:

a) imaging the printable, peelable transfer film of a sheet of the first heat transfer material to create an imaged printable, peelable transfer film;

b) separating the imaged printable, peelable transfer film from a remaining portion of the first heat transfer material;

c) positioning a sheet of the second heat transfer material and the imaged printable, peelable transfer film adjacent a substrate; and d) transferring the imaged printable, peelable transfer film and the overlay transfer film to the substrate.

In another aspect, a method of using the kit is disclosed that includes the steps of:

a) imaging the printable, peelable transfer film of one of the first heat transfer material to create an imaged printable, peelable transfer film;

b) overlaying the imaged printable, peelable transfer film with one of the second heat transfer material;

c) transferring the imaged printable, peelable transfer film to the first heat transfer material; and d) transferring the imaged printable, peelable transfer film and the overlay transfer film to a substrate.

Other features and aspects of the present invention are discussed in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figures in which.

Figure 1:
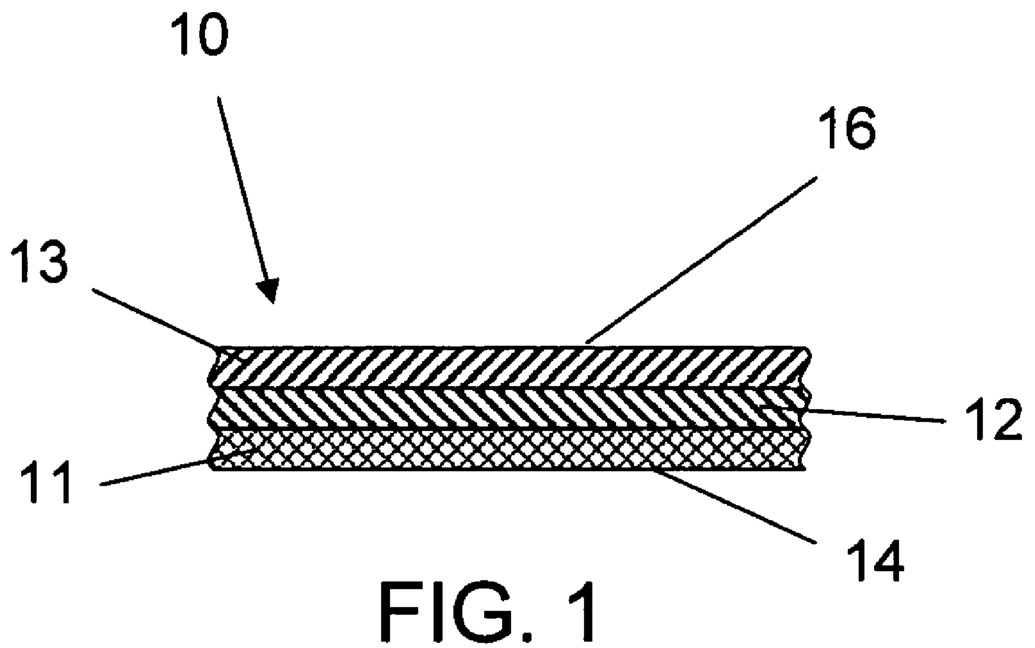
FIG. 1 is a fragmentary sectional view of a printable, peelable heat transfer material made in accordance with the present invention.

Repeat use of reference characters in the present specification and drawings is intended to represent same or analogous features or elements of the invention.

DETAILED DESCRIPTION OF REPRESENTATIVE EMBODIMENTS

Reference will now be made in detail to embodiments of the invention, one or more examples of which are provided herein. Each example is provided by way of explanation of the invention and not meant as a limitation of the invention. For example, features illustrated or described as part of one embodiment may be utilized with another embodiment to yield still a further embodiment. It is intended that the present invention include such modifications and variations as come within the scope of the appended claims and their equivalents.

Definitions

As used herein, the term "printable" is meant to include enabling the placement of an image on a material by any means, such as by direct and offset gravure printers, silk-screening, typewriters, laser printers, dot-matrix printers, and ink jet printers, by way of illustration. Moreover, the image composition may be any of the inks or other compositions typically used in printing processes.

The term "ink jet printable" refers to enabling the formation of an image on a material, e.g., paper, by means of an ink jet printer. In an ink jet printer, ink is forced through a tiny nozzle (or a series of nozzles) to form droplets. The droplets may be electrostatically charged and attracted to an oppositely charged platen behind the paper. By means of electrically controlled deflection plates, the trajectories of the droplets can be controlled to hit the desired spot on the paper. Unused droplets are deflected away from the paper into a reservoir for recycling. In another method, the droplets are ejected on demand from tiny ink reservoirs by heating to form bubbles as the print head scans the paper.

The term "molecular weight" generally refers to a weight-average molecular weight unless another meaning is clear from the context or the term does not refer to a polymer. It long has been understood and accepted that the unit for molecular weight is the atomic mass unit, sometimes referred to as the "dalton." Consequently, units rarely are given in current literature. In keeping with that practice, therefore, no units are expressed herein for molecular weights.

As used herein, the term "cellulosic nonwoven web" is meant to include any web or sheet-like material which contains at least about 50 percent by weight of cellulosic fibers. In addition to cellulosic fibers, the web may contain other natural fibers, synthetic fibers, or mixtures thereof. Cellulosic nonwoven webs may be prepared by air laying or wet laying relatively short fibers to form a web or sheet. Thus, the term includes nonwoven webs prepared from a papermaking furnish. Such furnish may include only cellulose fibers or a mixture of cellulose fibers with other natural fibers and/or synthetic fibers. The furnish also may contain additives and other materials, such as fillers, e.g., clay and titanium dioxide, surfactants, antifoaming agents, and the like, as is well known in the papermaking art.

The term "hard acrylic polymer" as used herein is intended to mean any acrylic polymer which typically has a glass transition temperature ($T_g$) of at least about 0 degrees Celsius. For example, the $T_g$ may be at least about 25 degrees Celsius. As another example, the $T_g$ may be in a range of from about 25 degrees Celsius to about 100 degrees Celsius. A hard acrylic polymer typically will be a polymer formed by the addition polymerization of a mixture of acrylate or methacrylate esters, or both. The ester portion of these monomers may be $C_1$-$C_6$ alkyl groups, such as, for example, methyl, ethyl, and butyl groups. Methyl esters typically impart "hard" properties, while other esters typically impart "soft" properties. The terms "hard" and "soft" are used qualitatively to refer to room-temperature hardness and low-temperature flexibility, respectively. Soft latex polymers generally have glass transition temperatures below about 0 degrees Celsius. These polymers flow too readily and tend to bond to the fabric when heat and pressure are used to effect transfer. Thus, the glass transition temperature correlates fairly well with polymer hardness.

As used herein, the term "cold release properties" means that once an image has been transferred to a substrate, such as cloth or another heat transfer paper, the backing or carrier sheet may be easily and cleanly removed from the substrate after the heat transfer material has cooled to ambient temperature. That is, after cooling, the backing or carrier sheet may be peeled away from the substrate to which an image has been transferred without resisting removal, leaving portions of the image on the carrier sheet, or causing imperfections in the transferred image coating.

DETAILED DESCRIPTION

The present invention relates to first and second matched heat transfer materials. The first heat transfer material includes a printable and peelable transfer film. The second heat transfer material includes an overlay transfer film having cold release properties.

Printable, Peelable Heat Transfer Material

In FIG. 1, a fragmentary section of a printable, peelable heat transfer material 10 is shown. The printable, peelable heat transfer material 10 includes a backing, or base, layer 11 having a backing layer exterior surface 14, a release layer 12 overlaying the backing layer, and a printable, peelable transfer film 13 overlaying the release layer and having a transfer film exterior surface 16. An image to be transferred (not shown) is to be applied to the printable, peelable transfer film exterior surface 16. Optionally, the printable, peelable heat transfer material may further include a tie coat layer (not shown) to improve the adhesion between the release layer and the printable, peelable transfer film in order to prevent premature delamination of the printable, peelable transfer film. Examples of heat transfer materials that include a printable and peelable transfer film are disclosed in U.S. patent application Ser. No. 10/003,697 filed Oct. 31, 2001 by Kronzer, the entirety of which is incorporated herein by reference.

The backing, or base, layer of the printable, peelable heat transfer material is flexible and has first and second surfaces. The backing layer typically will be a film or a cellulosic nonwoven web. In addition to flexibility, the backing layer also should have sufficient strength for handling, coating, sheeting, other operations associated with the manufacture thereof, and for removal after transfer of the printable, peelable transfer film. The basis weight of the base layer generally may vary from about 30 to about 150 g/m$^2$. By way of example, the backing, or base, layer may be a paper such as is commonly used in the manufacture of heat transfer papers. In some embodiments, the backing layer will be a latex-impregnated paper such as described, for example, in U.S. Pat. No. 5,798,179, the entirety of which is incorporated herein by reference. The backing layer is readily prepared by methods that are well known to those having ordinary skill in the art.

The release layer, or coating, overlays the first surface of the backing layer. The release coating can be fabricated from a wide variety of materials well known in the art of making peelable labels, masking tapes, etc. For example, silicone polymers are very useful and well known. In addition, many types of lattices such as acrylics, polyvinylacetates, polystyrenes, polyvinyl alcohols, polyurethanes, polyvinychlorides, as well as many copolymer lattices such as ethylene-vinylacetate copolymers, acrylic copolymers, vinyl chloride-acrylics, vinylacetate acrylics, etc. can be used. In some cases, it may be helpful to add release agents to the release coatings such as soaps, detergents, silicones etc., as described in U.S. Pat. No. 5,798,179. The amounts of such release agents can then be adjusted to obtain the desired release.

If desired, the release coating layer may contain other additives, such as processing aids, release agents, pigments, deglossing agents, antifoam agents, rheology control agents and the like. The thickness of the release coatings is not critical. In order to function correctly, the bonding between the printable, peelable transfer film and the release coating should be such that about 0.01 to 0.3 pounds per inch of force is required to remove the printable, peelable transfer film from the backing. If the force is too great, the printable, peelable transfer film may tear when it is removed, or it may stretch and distort. If it is too small, the printable, peelable transfer film may detach in processing the material into sheets or in the printer.

The release coating layer may have a layer thickness, which varies considerably depending upon a number of factors including, but not limited to, the backing layer to be coated, and the printable, peelable transfer film to be temporarily bonded to it. Typically, the release coating layer has a thickness of less than about 2 mil (52 microns). More desirably, the release coating layer has a thickness of from about 0.1 mil to about 1.0 mil. Even more desirably, the release coating layer has a thickness of from about 0.2 mil to about 0.8 mil.

The thickness of the release coating layer may also be described in terms of a basis weight. Desirably, the release coating layer has a basis weight of less than about 45 $g/m^2$. More desirably, the release coating layer has a basis weight of from about 25 $g/m^2$ to about 2 $g/m^2$. Even more desirably, the release coating layer has a basis weight of from about 15 $g/m^2$ to about 4 $g/m^2$.

As mentioned above, the printable, peelable heat transfer material further includes a printable, peelable transfer film overlaying the release layer. The printable, peelable transfer film includes an adhesive layer overlaying the release layer that desirably provides permanent bonding to a fabric after application of heat and pressure. The printable, peelable transfer film may optionally include a separate flow-resistant (when heated) layer that overlays the adhesive layer and that desirably does not penetrate the fabric during the transfer process, but remains on or at the surface thereof. Additionally, the printable, peelable transfer film may optionally include a separate image-receptive coating at the exterior of the printable, peelable heat transfer material.

The printable, peelable transfer film is printable with an image that is to be permanently transferred to a substrate. The printable, peelable transfer film is peelable from the release layer so that the image may be transferred to a substrate with the image facing away from the surface of the substrate. If the method of transfer is to employ use of a self-supporting film, that is, if the printable, peelable transfer film is to be printed when attached to a backing and then removed before it is transferred, the thickness of the printable, peelable transfer film should be sufficient so that it can be handled after printing and peeling it from the backing without being stretched or torn. However, if the printable, peelable transfer film is too thick or stiff, it will impart too much stiffness to the fabric after it is transferred. A printable, peelable transfer film thickness of from about 0.8 to about 3 mils meets these requirements, while a film thickness of from about 1.2 to about 2.5 mils is desired. The range of printable, peelable transfer films which may be useful is broadened considerably if the method of transfer is to print the surface of the first heat transfer material, then transfer the imaged printable, peelable transfer film to the overlay transfer material, and then transfer the combined films to a substrate. In this method, handling of a free film is not necessary. In fact, it is envisioned that this printable, peelable transfer film thickness could be as thin as about 0.1 mils.

The printable, peelable transfer film desirably substantially prevents penetration of the image, dyes, or pigments into the underlying layer. When transferred to a fabric, the printable, peelable transfer film desirably substantially prevents penetration of the printed image into the fabric. The printable, peelable transfer film desirably becomes a very durable, washable, image-bearing surface on the fabric after being transferred. Additionally, the composition of the printable, peelable transfer film can be tailored to fit various printing methods for printing the image, including ink jet, laser jet, thermal transfer, electrostatic toner transfer and others.

For decoration of dark fabrics, the printable, peelable transfer film may further include an opacifier. The use of opaque layers in heat transfer materials for decoration of dark colored fabrics is described in U.S. patent application Ser. No. 10/003,697, filed Oct. 31, 2001. The opacifier is a particulate material that scatters light at its interfaces so that the peelable, printable transfer film is relatively opaque. Desirably, the opacifier is white and has a particle size and density well suited for light scattering. Such opacifiers are well known to those skilled in the graphic arts, and include particles of minerals such as aluminum oxide and titanium dioxide or of polymers such as polystyrene. The amount of opacifier needed in each case will depend on the desired opacity, the efficiency of the opacifier, and the thickness of the printable, peelable transfer film. For example, titanium dioxide at a level of approximately 20 percent in a film of one mil thickness provides adequate opacity for decoration of black fabric materials. Titanium dioxide is a very efficient opacifier and other types generally require a higher loading to achieve the same results.

As mentioned above, the printable, peelable transfer film includes an adhesive layer. The adhesive layer may be, for example, the peelable, uncrosslinked film layer described in U.S. patent application Ser. No. 10/003,697, filed Oct. 31, 2001. The adhesive layer provides permanent bonding to a fabric after application of heat and pressure. The adhesive layer may include any material capable of melting and conforming to the surface of a substrate to be decorated. Many types of polymeric films can provide the desired bonding. Exemplary materials include polyolefins, copolymers of olefins and other monomers such as vinyl acetate, acrylic acid, methacrylic acid, acrylic esters, styrene and others. Other types of useful polymers that form films include polyamides, polyesters, and polyurethanes. Desirably, the adhesive layer also has a melting temperature and/or softening temperature of less than about 205 degrees Celsius. The term "melts" and variations thereof are used herein only in a qualitative sense and are not meant to refer to any particular test procedure. Reference herein to a melting temperature or range is meant only to indicate an approximate temperature or range at which the polymer melts and flows under the conditions of the melt-transfer process described herein to result in a substantially smooth film. In so doing, such materials may flow at least partially into a fiber matrix of a fabric to which an image is being transferred. In order to melt and bond sufficiently, the printable, peelable transfer film desirably has a melt flow index of less than about 800 as determined using ASTM D1238-82. More desirably, the adhesive layer has a melt flow index of from about 0.5 to about 800, and a softening temperature of from about 65 degrees Celsius to about 150 degrees Celsius. Even more desirably, the adhesive layer has a melt flow index of from about 2 to about 600, and a softening temperature of from about 90 degrees Celsius to about 120 degrees Celsius. The adhesive layer may include an opacifier as described above.

As mentioned above, the printable, peelable transfer film may include a flow-resistant layer. The flow-resistant layer may soften with heat but does not flow appreciably into the fabric upon transfer of the printable, peelable transfer film to the fabric. For the flow-resistant layer, the melt flow index may be less than that of the peelable adhesive layer, such as by a factor of at least 10, desirably by a factor of at least 100, and most desirably by a factor of at least 1000. Desirably, the thickness of the flow-resistant layer is approximately 0.4 to about 2 mils.

In one embodiment, the flow-resistant layer includes a crosslinked polymer. The utilization of cross-linked layers in peelable heat transfer films is described in detail in U.S. patent application Ser. No. 10/003,697, filed Oct. 31, 2001. The cross-linked polymer may be formed from a crosslinkable polymeric binder and a crosslinking agent. The crosslinking agent reacts with the crosslinkable polymeric binder to form a 3-dimensional polymeric structure. Generally, it is contemplated that any pair of polymeric binder and crosslinking agent that reacts to form the 3-dimensional polymeric structure may be utilized. Crosslinkable polymeric binders that may be used are any that may be cross-linked to form a 3-dimensional polymeric structure. Desirable crosslinking binders include those that contain reactive carboxyl groups. Exemplary crosslinking binders that include carboxyl groups include acrylics, polyurethanes, ethylene-acrylic acid copolymers, and so forth. Other desirable crosslinking binders include those that contain reactive hydroxyl groups. Cross-linking agents that can be used to crosslink binders having carboxyl groups include polyfunctional aziridines, epoxy resins, carbodiimide, oxazoline functional polymers, and so forth. Cross-linking agents that can be used to crosslink binders having hydroxyl groups include melamine-formaldehyde, urea formaldehyde, amine-epichlorohydrin, multi-functional isocyanates, and so forth.

In another embodiment, the flow-resistant layer may include a polymer and a particulate material. The particulate material is desirably present in an amount that raises the viscosity of the polymer at transfer temperatures such that the polymer and particulate material do not flow into the fabric, but form a film on the surface of the fabric. Desirably, the particulate material is present in the flow-resistant layer from about 20 percent to about 70 percent by weight. The particulate matter may include, for example, cellulose particles, silica particles, clay particles, and so forth. In one embodiment, silica particles are present in the flow-resistant layer from about 33 percent to about 66 percent by weight, more desirably from about 40 percent to about 60 percent by weight, and even more desirably from about 45 percent to about 55 percent by weight.

Processing aids such as surfactants, dispersants, and viscosity modifiers may be included in the flow-resistant layer. Additionally, the flow-resistant layer may contain the opacifier discussed above. When the flow-resistant layer contains the opacifier, less opacifier may be required because the flow-resistant layer does not penetrate the surface of the fabric during transfer.

As mentioned above, the printable, peelable transfer film may further include an image-receptive coating. An image-receptive coating is often used when a specific printing method will be used to create the image on the printable, peelable transfer film. Such image-receptive coatings are described in U.S. patent application Ser. No. 10/003,697, filed Oct. 31, 2001. To make the printable, peelable transfer film ink jet printable, the image-receptive coating may be very similar to those described in U.S. Pat. Nos. 5,798,179, 5,501,902, and 6,033,739, the entireties of which are incorporated herein by reference. These coatings contain thermoplastic particles, binders and cationic resins as well as ink viscosity modifiers and are useful in conventional ink jet printing applications for fabric transfer. A crosslinking agent may be added to such coatings so they will be held on the surface when a transfer is conducted as described above for the flow-resistant layer. For use with other imaging methods, the requirements are slightly different. For electrostatic printing, an acrylic or polyurethane binder and a crosslinking agent may be sufficient since this printing method does not require powdered polymers for ink absorbency, cationic polymers, or ink viscosity modifiers. Instead, slip agents and anti-static agents can be added to the crosslinked coating to provide reliable sheet feeding into the printers. For thermal printings or crayon marking coatings, such as those described in U.S. Pat. No. 5,342,739, these coatings may be modified by addition of a crosslinking agent.

The layers that are based on a film-forming binder may be formed on a given layer by known coating techniques, such as by roll, blade, Meyer rod, and air-knife coating procedures. The resulting heat transfer material then may be dried by means of, for example, steam-heated drums, air impingement, radiant heating, or some combination thereof. The melt-extruded layers may be applied with an extrusion coater that extrudes molten polymer through a screw into a slot die. The film exits the slot die and flows by gravity onto the heat transfer material. The resulting coated material is passed through a nip to chill the extruded film and bond it to the underlying layer. For less viscous polymers, the molten polymer may not form a self-supporting film. In these cases, the material to be coated may be directed into contact with the slot die or by using rolls to transfer the molten polymer from a bath to the heat transfer material.

Finally, a tie-coat layer may overlay the release layer and underlay the printable, peelable transfer film, thereby being located between the release layer and the printable, peelable transfer film. In general, the tie-coat layer is not necessary when the printable, peelable transfer film is formed from a film-forming binder. However, when the printable, peelable transfer film is a melt-extruded film, the printable, peelable transfer film may have poor adhesion to the release layer. Poor adhesion may result in premature delamination of the printable, peelable transfer film from the release layer. To prevent delamination in such cases, the tie-coat layer is desirable. In general, the tie-coat layer may include a film-forming binder that melts in a range of from about 65 degrees Celsius to about 180 degrees Celsius. Moreover, the tie-coat layer also may include a powdered thermoplastic polymer.

If desired, any of the foregoing film layers may contain other materials, such as processing aids, release agents, pigments, deglossing agents, antifoam agents, and the like. The use of these and similar materials is well known to those having ordinary skill in the art.

Overlay Heat Transfer Material

Figure 2:
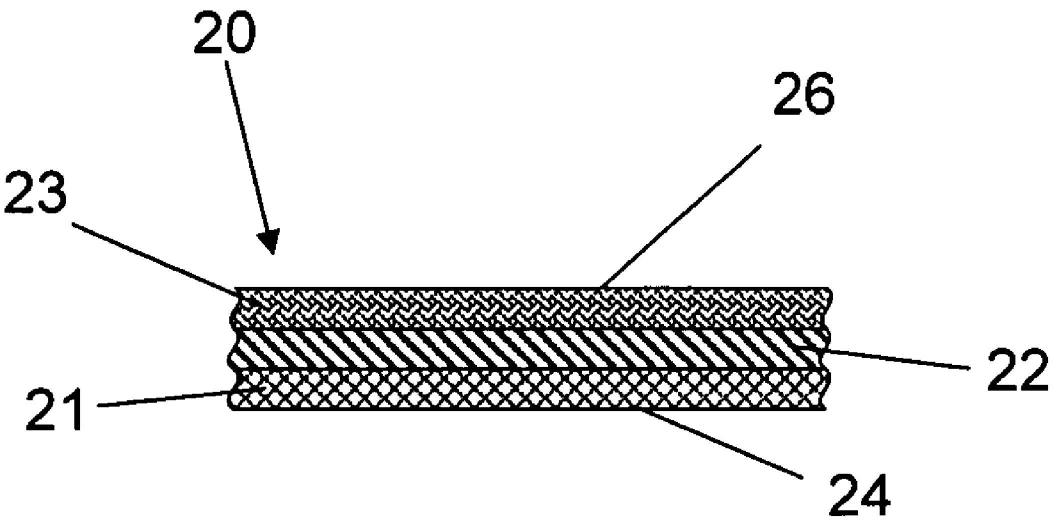
FIG. 2 is a fragmentary sectional view of an overlay heat transfer material made in accordance with the present invention.

In FIG. 2, a fragmentary section of an overlay heat transfer material 20 is shown. The overlay heat transfer material 20 includes a backing, or base, layer 21 having a backing layer exterior surface 24, a release layer 22 overlaying the backing layer, and an overlay transfer film 23 overlaying the release layer and having an overlay transfer film exterior surface 26. Optionally, the overlay heat transfer material 20 may further include a conformable layer (not shown) between the backing layer 21 and the release layer 22 to facilitate the contact between the overlay transfer film 23 and the printable, peelable transfer film 13 of the printable, peelable heat transfer material 10. The use of conformable layers of this type is described in U.S. patent application Ser. No. 09/614,829, filed Jul. 12, 2000, the entirety of which is incorporated herein by reference. As a further option, the overlay heat transfer material 20 may further include an image-receptive layer (not shown).

Desirably, the overlay heat transfer material has cold-release properties. Heat transfer materials having cold-release properties have been previously disclosed, for example, in U.S. Pat. Nos. 6,200,668, 5,798,179, and 6,428,878, the contents of which are incorporated herein in their entirety. Other heat transfer materials having cold-release properties, for example, are disclosed in concurrently filed U.S. patent application Ser. No. 10/750,387, Express Mail Number EL 955701798 US, the entirety of which is incorporated herein by reference.

The backing, or base, layer of the overlay heat transfer material may be substantially as described above for the backing layer of the printable, peelable heat transfer material. The backing layer of the overlay heat transfer material is flexible and has first and second surfaces. The flexible backing layer typically will be a film or a cellulosic nonwoven web. In addition to flexibility, the backing layer also should have sufficient strength for handling, coating, sheeting, other operations associated with the manufacture thereof, and for removal after transfer. By way of example, the backing layer may be a paper such as is commonly used in the manufacture of heat transfer papers. The backing layer is readily prepared by methods that are well known to those having ordinary skill in the art.

The release layer of the overlay transfer material may be substantially as described above for the release layer of the printable, peelable, heat transfer material. The release layer of the overlay transfer material overlays the first surface of the backing layer. The basis weight of the release layer generally may vary from about 2 to about 30 $g/m^2$. In one embodiment, the release layer has essentially no tack at transfer temperatures (e.g., 177 degrees Celsius). As used herein, the phrase "having essentially no tack at transfer temperatures" means that the release layer does not stick to the overlying transfer film to an extent sufficient to adversely affect the quality of the transferred image. By way of illustration, the release layer may include a hard acrylic polymer or poly(vinyl acetate). As another example, the release layer may include a thermoplastic polymer having a $T_g$ of at least about 25 degrees Celsius. As another example, the $T_g$ may be in a range of from about 25 degrees Celsius to about 100 degrees Celsius. Suitable polymers include, for example, polyacrylates, styrene-butadiene copolymers, ethylene vinyl acetate copolymers, nitrile rubbers, poly(vinyl chloride), poly(vinyl acetate), ethylene-acrylate copolymers, and so forth, which have suitable glass transition temperatures.

In another embodiment, the release layer may include a crosslinked polymer. The cross-linked polymer may be formed from a crosslinkable polymeric binder and a crosslinking agent. The crosslinking agent reacts with the crosslinkable polymeric binder to form a 3-dimensional polymeric structure. Generally, it is contemplated that any pair of the polymeric binders and crosslinking agents described above for the flow-resistant layer may be utilized in the release layer of the overlay heat transfer material.

The release layer also may include an effective amount of a release-enhancing additive. For example, the release enhancing additive may include a divalent metal ion salt of a fatty acid, a polyethylene glycol, a polysiloxane surfactant, or a mixture thereof. More particularly, the release-enhancing additive may include calcium stearate, a polyethylene glycol having a molecular weight of from about 2,000 to about 100,000, a siloxane polymer polyether, or a mixture thereof.

As mentioned above, the overlay transfer film overlays the release layer. The basis weight of the overlay transfer film generally may vary from about 2 to about 70 $g/m^2$. The overlay transfer film desirably includes a thermoplastic polymer that melts in a range of from about 65 degrees Celsius to about 180 degrees Celsius. The overlay transfer film functions as an image protection or overlay coating upon subsequent transfer of the coating to the printed surface of the printable, peelable heat transfer material. In one embodiment, the overlay transfer film may be formed by applying a coating of a film-forming binder over the release layer. The binder may include a powdered thermoplastic polymer, in which case the overlay transfer film will include greater than about 10 percent by weight of the film-forming binder and less than about 90 percent by weight of the powdered thermoplastic polymer. In general, each of the film-forming binder and the powdered thermoplastic polymer will melt in a range of from about 65 degrees Celsius to about 180 degrees Celsius. For example, each of the film-forming binder and powdered thermoplastic polymer may melt in a range of from about 80 degrees Celsius to about 120 degrees Celsius. In addition, the powdered thermoplastic polymer may consist of particles that are from about 2 to about 50 micrometers in diameter.

In general, any film-forming binder may be employed which meets the criteria specified herein. As a practical matter, water-dispersible ethylene-acrylic acid copolymers have been found to be especially effective film-forming binders.

Similarly, the powdered thermoplastic polymer may be any thermoplastic polymer that meets the criteria set forth herein. For example, the powdered thermoplastic polymer may be a polyamide, polyester, ethylene-vinyl acetate copolymer, or polyolefin.

Manufacturers' published data regarding the melt behavior of film-forming binders or powdered thermoplastic polymers correlate with the melting requirements described herein. It should be noted, however, that either a true melting point or a softening point may be given, depending on the nature of the material. For example, materials such a polyolefins and waxes, being composed mainly of linear polymeric molecules, generally melt over a relatively narrow temperature range since they are somewhat crystalline below the melting point. Melting points, if not provided by the manufacturer, are readily determined by known methods such as differential scanning calorimetry. Many polymers, and especially copolymers, are amorphous because of branching in the polymer chains or the side-chain constituents. These materials begin to soften and flow more gradually as the temperature is increased. It is believed that the ring and ball softening point of such materials, as determined, for example, by ASTM Test Method E-28, is useful in predicting their behavior in the present invention. Moreover, the melting points or softening points described are better indicators of performance in this invention than the chemical nature of the polymer.

The layers that are based on a film-forming binder may be formed on a given layer by known coating techniques, such as by roll, blade, Meyer rod, and air-knife coating procedures. The resulting heat transfer material then may be dried by means of, for example, steam-heated drums, air impingement, radiant heating, or some combination thereof.

Alternatively, the overlay transfer film may be a melt-extruded film. The criteria for a melt-extruded film that forms the overlay transfer film are generally the same as those described above for the film-forming binders. The polymer of which a melt-extruded overlay transfer film is composed typically will melt in a range of from about 80 degrees Celsius to about 130 degrees Celsius. The polymer should have a melt index, as determined in accordance with ASTM Test Method D-1238-82, of at least about 25 g/10 minutes. The chemical nature of the polymer is not known to be crucial. Polymer types which satisfy these criteria and are commercially available include, by way of illustration only, copolymers of ethylene and acrylic acid, methacrylic acid, vinyl acetate, ethyl acetate, or butyl acrylate. Other polymers that may be employed include polyesters, polyamides, and polyurethanes. Waxes, plasticizers, rheology modifiers, antioxidants, antistats, antiblocking agents, release agents, and other additives may be included as either desired or necessary.

The melt-extruded layers may be applied with an extrusion coater that extrudes the molten polymer through a screw into a slot die. The film exits the slot die and flows by gravity onto the heat transfer material. The resulting coated material is passed through a nip to chill the extruded layer and bond it to the underlying material. For less viscous polymers, the molten polymer may not form a self-supporting film. In these cases, the heat transfer material may be coated by directing it into contact with the slot die or by using rolls to transfer the molten polymer from a bath to the heat transfer material.

An ink-compatible layer may be useful for the overlay heat transfer material. An ink-compatible layer may be particularly useful when an image is to be placed on the printable, peelable heat transfer material by an ink jet printer, i.e., when the printable, peelable heat transfer material is ink jet printable. When the printed surface of the printable, peelable heat transfer material is later matched to the surface of the ink-compatible layer, the ink-compatible layer can help prevent or minimize feathering of the printed image and bleeding or loss of the image when the transferred image is washed and dried. The ink-compatible layer may be substantially as described above for the image-receptive coating on the printable, peelable heat transfer material, so long as the ink-compatible layer remains bondable to the printable, peelable transfer film of the corresponding printable, peelable heat transfer material.

A tie coat layer may overlay the release layer and underlie the overlay transfer film, thereby being located between the release layer and the overlay transfer film. The tie coat layer, when used, may be substantially as described above for the tie coat layer of the printable, peelable heat transfer material.

The overlay transfer material may further include a conformable layer overlaying the base layer and underlying the release layer, thereby being located between the base layer and the release layer. In general, the conformable layer may include an extrusion coated polymer that melts in a range of from about 65 degrees Celsius to about 180 degrees Celsius as described above for the overlay transfer film. As an example, the conformable layer may be an extrusion coating of ethylene vinyl acetate. Alternatively, the conformable layer may include a film-forming binder and/or a powdered thermoplastic polymer as above described for the overlay transfer film. The basis weight of the conformable layer generally may vary from about 5 to about 60 g/m$^2$.

If desired, any of the foregoing film layers of the overlay heat transfer material may contain other materials, such as processing aids, release agents, pigments, deglossing agents, antifoam agents, and the like. The use of these and similar materials is well known to those having ordinary skill in the art.

Methods of Using the Matched Heat Transfer Papers

Figure 3A:
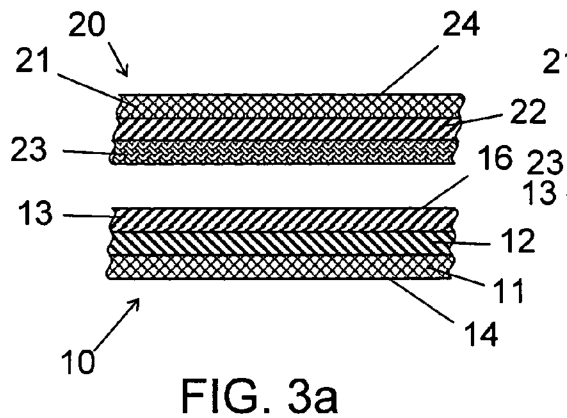
FIGS. 3*a*-3*f* are fragmentary sectional views depicting a method of transferring an image to a substrate using a printable, peelable heat transfer material and an overlay heat transfer material in accordance with the present invention.
Figure 3B:
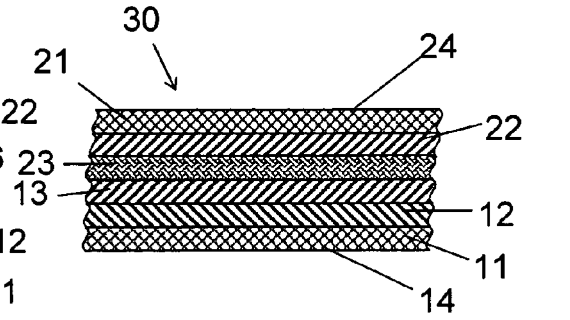

It is envisioned that the matched heat transfer papers of the present invention may be used in several different methods of applying printed images to fabrics or other substrate materials. Referring to FIGS. 3*a*-3*f*, an embodiment of a method of transferring an image to a substrate using the printable, peelable heat transfer material 10 of FIG. 1 and the overlay heat transfer material 20 of FIG. 2 is depicted. Referring to FIG. 3*a*, the external surface 16 of the printable, peelable heat transfer material 10 is imaged using a standard imaging device (not shown). Imaging devices compatible with the present invention include, by way of example only, ink jet printers, laser jet printers, pencils, pens, markers, crayons, and so forth. Referring to FIG. 3*b*, after imaging of the printable, peelable heat transfer material 10, the imaged peelable heat transfer material is placed adjacent the overlay heat transfer material 20 with the respective transfer films 13, 23 facing each other. Heat and pressure are applied to the backing layer external surface 14, 24 of one or both sides of the two transfer materials 10, 20, causing the transfer layers 13, 23 on the respective transfer materials to fuse or melt together and form a fused laminate 30. It is the capability of the heat transfer papers to form the fused laminate 30 that makes the heat transfer papers "matched". The application of heat and pressure may be effected in a variety of ways known to those skilled in the art. For example, a heat press (not shown) may be used to fuse the layers together. As another example, a standard hand iron (not shown) may be used to apply heat and pressure to the two materials. Desirably, the heat and pressure are applied for an effective period of time to provide good adhesion between the transfer films 13, 23. Desirably, the temperature used to perform the transfer is from about 120 degrees Celsius to about 200 degrees Celsius, even more desirably from about 150 degrees Celsius to about 175 degrees Celsius.

Figure 3C:
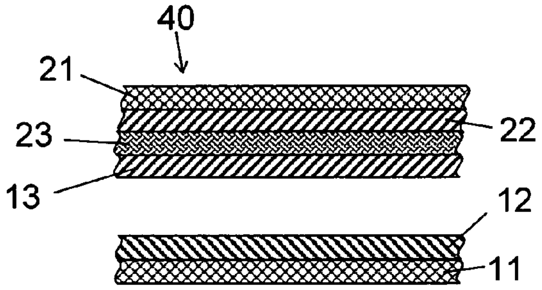
Figure 3D:
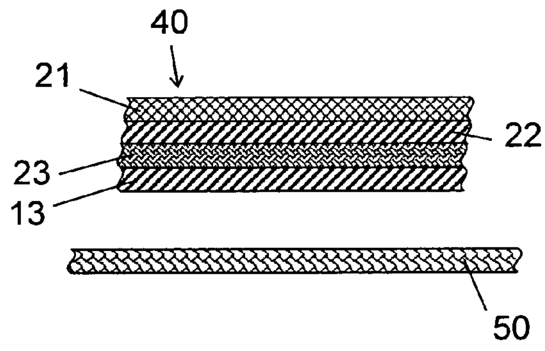
Figure 3E:
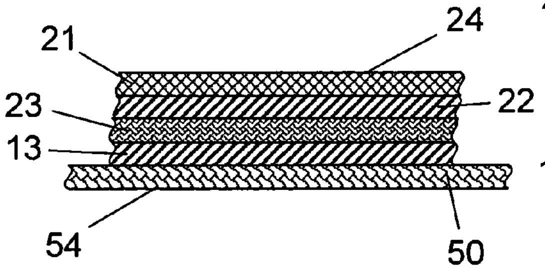
Figure 3F:
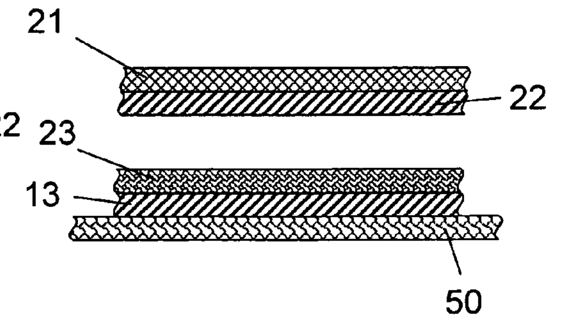

Referring to FIG. 3*c*, the backing layer 11 and release layer 12 from the peelable, printable heat transfer material 10 are together peeled from the fused laminate 30 to form an intermediary transfer material 40, leaving exposed the printable, peelable transfer film 13 that is to be transferred to a substrate 50. At this point, the image is sandwiched between the printable, peelable transfer film 13 and the overlay transfer film 23. Referring to FIG. 3*d*, the intermediary transfer material 40 is then placed against the substrate 50 with the transfer films 13, 23 facing the substrate and the overlay backing layer 21 facing away from the substrate. Desirable substrates include, for example, fabrics such as 100% cotton T-shirt material, and so forth. Referring to FIG. 3*e*, heat and pressure are then applied to the overlay backing layer external surface 24, a substrate external surface 54, or both to cause the printable, peelable transfer film 13 to fuse to the substrate 50. As above, the amount of heat and pressure as well as duration of application thereof are determined according to the method of application, the type of substrate, and the type of transfer desired. Desirably, the temperature used to perform the transfer is as described above. Referring to FIG. 3*f*, after cooling, the overlay material backing layer 21 and release layer 22 are together removed from the substrate 50, leaving the printable, peelable transfer film 13, the image, and the overlay transfer film 23 attached to the substrate.

Optionally, an extraneous area of the peelable transfer film of the printable, peelable heat transfer paper may be removed if desired. For example, if letters are to be transferred, the center of the letter "0" could be removed, or "weeded." Thus, the precise areas of the peelable transfer film that are to be transferred can be controlled. Desirably, the printable, peelable transfer film is slit around the extraneous portion without cutting through the underlying layers of the printable, peelable heat transfer paper. The extraneous portion is then peeled from the printable, peelable heat transfer paper, leaving a desired "weeded" imaged area for transfer. After the transfer, only the desired areas from the imaged area are present on the substrate. Desirably, there is also no transfer of the overlay transfer film to the areas of the substrate where no image was transferred. It should be noted that the removal of the extraneous areas from the printable, peelable transfer film will sometimes leave several unconnected portions of the imaged film on the backing layer.

After transfer to the substrate, the spacing and orientation of these unconnected portions is maintained.

In both the printable, peelable heat transfer material and the overlay heat transfer material, a detachment force is required to separate the respective release layers and backings from the overlying transferable films. Desirably, in a matched set of papers it requires more force to detach the release layer and backing of the overlay heat transfer material than to detach the release layer and backing of the printable, peelable heat transfer material. As noted above, after the two heat transfer materials are fused together in the process of transferring the imaged printable, peelable transfer film to the overlay heat transfer material, it is desirable to first remove the base layer and release layer of the printable, peelable heat transfer material. If the detachment force to remove these layers is too high compared to that of the overlay heat transfer material, inadvertent removal of the release layer and backing layer of the overlay heat transfer material may occur instead.

Additionally, it is desirable that a portion of the overlay transfer film will not transfer to areas of the substrate where there is not a corresponding portion of the imaged printable, peelable transfer film. Put another way, it is desirable that the overlay transfer film will not transfer in areas where the imaged peelable transfer film was removed during the weeding process. To prevent transfer of the overlay transfer film to the areas of the substrate where there is not a corresponding portion of the imaged printable, peelable transfer film, it is desirable that the release layer and backing layer of the overlay heat transfer material not detach too easily from the overlay transfer film.

Figure 4A:
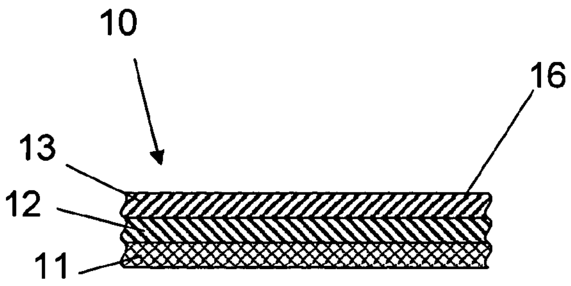
FIGS. 4*a*-4*e* are fragmentary sectional views depicting another method of transferring an image to a substrate using a printable, peelable heat transfer material and an overlay heat transfer material in accordance with the present invention.
Figure 4B:
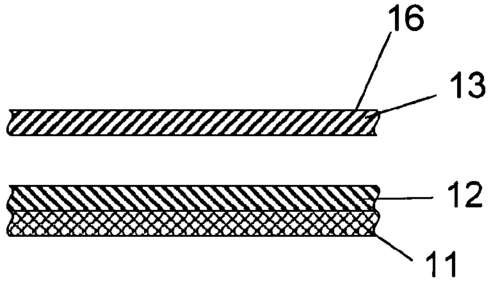
Figure 4C:
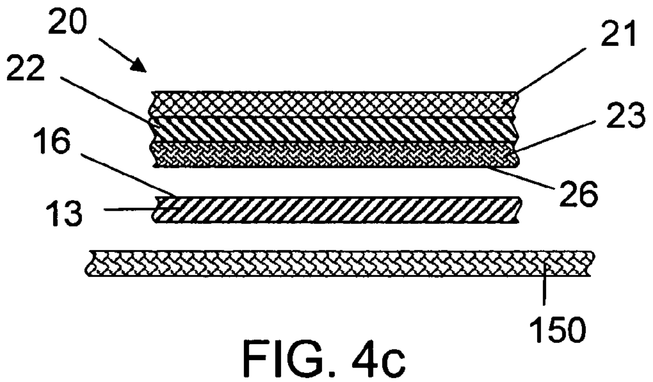
Figure 4D:
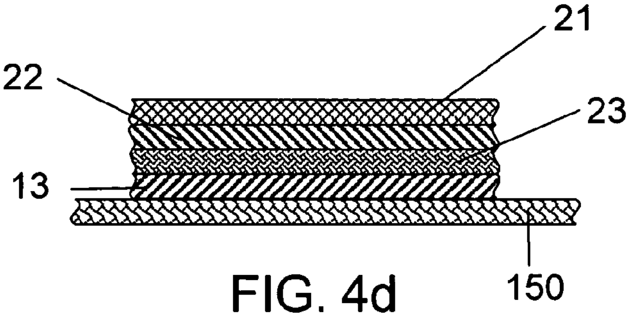
Figure 4E:
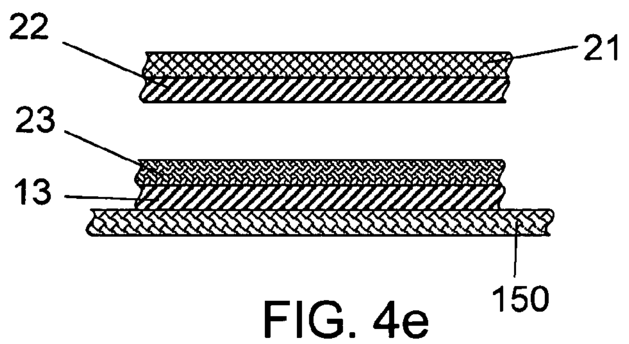

Referring to FIGS. 4*a*-4*e*, another embodiment of a method of transferring an image to a substrate using the printable, peelable heat transfer material 10 of FIG. 1 and the overlay heat transfer material 20 of FIG. 2 is depicted. Referring to FIG. 4*a*, the printable, peelable heat transfer material 10 is imaged on the transfer film exterior surface 16 using a standard imaging device (not shown) as described above. Referring to FIG. 4*b*, the imaged printable, peelable transfer film 13 is then peeled or otherwise removed from the backing layer 11 and release layer 12. Referring to FIG. 4*c*, the imaged printable, peelable transfer film 13 is placed adjacent a substrate 150 with the imaged transfer film exterior surface 16 facing away from the substrate. The overlay heat transfer material 20 as described above is then placed with the overlay transfer film 23 facing the imaged peelable transfer film 13. Referring to FIG. 4*d*, the substrate 150, the imaged printable, peelable transfer film 13, and the overlay heat transfer paper 20 are heated and pressed to adhere the imaged printable, peelable transfer film to the substrate and adhere the overlay transfer film 23 to the imaged transfer film exterior surface 16. Referring to FIG. 4*e*, after cooling, the overlay material backing layer 21 and release layer 22 are together removed from the substrate 150, leaving the printable, peelable transfer film 13, the image, and the overlay transfer film 23 attached to the substrate. Desirably, the temperature used to perform the transfer is as described above.

In one embodiment, it is envisioned that a matched set of heat transfer materials or papers such as described herein may be provided to enable the transfer of printed images to fabrics and other substrates. The matched transfer materials may be provided as a kit in which a supply of both the printable, peelable heat transfer material and the overlay heat transfer material may be present in the kit. The printable, peelable heat transfer materials and/or the overlay heat transfer materials may be labeled appropriately so as to allow a user to distinguish therebetween. The kit may contain an equal number of the overlay heat transfer materials and the printable, peelable heat transfer materials. Alternatively, the kit may contain more of the printable, peelable heat transfer materials than the overlay heat transfer materials. Additionally, the kit may contain not only the printable, peelable heat transfer materials and the overlay heat transfer materials, but may also contain one or more stick-resistant overlay materials that may be useful in some applications as an alternative to using the overlay heat transfer materials. As an example, an imaged printable, peelable transfer film could be peeled from an imaged printable, peelable heat transfer material and then transferred directly to a substrate using the stick-resistant overlay material. Many non-stick overlay materials are known to those skilled in the art. As one example, a non-stick overlay material may be a paper having a silicone coating on a surface thereof.

The present invention may be better understood with reference to the examples that follow. Such examples, however, are not to be construed as limiting in any way either the spirit or scope of the present invention. In the examples, all parts are parts by weight unless stated otherwise.

EXAMPLES

Example 1

A printable, peelable heat transfer paper was prepared having a base layer, a release layer overlaying the base layer, and a printable, peelable transfer film overlaying the release layer. The printable, peelable transfer film included an adhesive layer overlaying the release layer, a flow-resistant opaque layer overlaying the adhesive layer, and an image-compatible layer overlaying the flow-resistant opaque layer. The base layer was a cellulosic fiber paper having a basis weight of 86.3 g/m$^2$. The release layer was a mixture of 3.3 parts acrylic latex (available as Rhoplex SP-100 from Rohm & Haas of Philadelphia, Pa.) and 2.0 parts kaolin clay (available as Ultrawhite 90 from Engelhard of Iselin, N.J.) coated on the paper as an aqueous dispersion and dried to a basis weight of 10.2 g/m$^2$. The adhesive layer was ethylene methacrylic acid copolymer (available as Nucrel 599LG from DuPont of Wilmington, Del.) extrusion coated on the release layer at a basis weight of 42.5 g/m$^2$. The flow-resistant opaque layer was a mixture of 4.0 parts titanium dioxide (available as RPD Vantage from DuPont), 10.9 parts ethylene acrylic acid copolymer (available as Michem Prime 4983 from Michelman Inc. of Cincinnati, Ohio), 0.2 parts nonionic surfactant (available as Triton X 100 from The Dow Chemical Company of Midland, Mich.), and 0.4 parts aziridine crosslinking agent (available as Xama 7 from Sybron Chemicals, Inc. of Birmingham, N.J.) coated on the adhesive layer as an aqueous dispersion and dried to a basis weight of 30 g/m$^2$. The image-compatible layer was a mixture of 0.1 parts nonionic surfactant (available as Triton X 100 from The Dow Chemical Company), 1.9 parts 1,4 cyclohexane dimethanol dibenzoate (available as Benzoflex 352 from Velsicol Chemical Corporation of Rosemont, Ill.) micronized to about 8 micron average particle size, 2.4 parts ethylene acrylic acid copolymer (available as Michem Prime 4983 from Michelman Inc.), 4.9 parts powdered polyamide (available as Orgasol 3510 EXD from Atofina Chemicals Inc. of Philadelphia, Pa.), 0.19 parts aziridine crosslinking agent (available as Xama 7 from Sybron Chemicals, Inc.), 0.02 parts nonionic surfactant (available as Tergitol 15-S40 from BASF Corporation of Mount Olive, N.J.), 0.18 parts of polyethylene oxide (available as Polyox N60 from The Dow Chemical Company), 0.24 parts poly(diallyldimethyl ammonium chloride) (available as Glascol F207 from Ciba Specialty Chemicals of Tarrytown, N.Y.), and 0.10 parts of hydroxypropyl cellulose (available as Klucel G from Hercules, Inc. of Wilmington, Del.) coated on the flow-resistant opaque layer as an aqueous dispersion and dried to a basis weight of 19.5 g/m$^2$.

An overlay heat transfer paper was prepared having a base layer, a release layer overlaying the base layer, and an overlay transfer film overlaying the release layer. The base layer was a cellulosic fiber paper having a basis weight of 86.3 g/m$^2$. The release layer was a mixture of 4.4 parts acrylic latex and 2.6 parts kaolin clay coated on the paper as an aqueous dispersion and dried to a basis weight of 10.2 g/m$^2$. The overlay transfer film was ethylene methacrylic acid copolymer extrusion coated on the release layer at a basis weight of 42.5 g/m$^2$.

The printable, peelable heat transfer paper was imaged with a standard Hewlett-Packard 970 ink jet printer. A safety knife was used to remove some extraneous portions of the printable, peelable transfer film of the printable, peelable heat transfer paper. Specifically, the printable, peelable transfer film was slit around the extraneous portion without cutting through the underlying layers of the printable, peelable heat transfer paper. The extraneous portion was peeled from the printable, peelable heat transfer paper, leaving a desired “weeded” imaged area for transfer. The remaining imaged printable, peelable transfer film was then transferred to the overlay heat transfer paper by placing the two heat transfer papers with the respective transfer films facing toward each other in a standard heat press (Hotronix model XSW available from Stahls' Hotronix of Masontown, Pa.) at 175 degrees Celsius for 15 seconds at a pressure setting of seven. Thereafter, the samples were peeled apart with the imaged portions, including the printable, peelable transfer film, transferring to the overlay heat transfer paper. The overlay heat transfer paper with the imaged printable, peelable transfer film adhered thereto was then placed face down on a piece of black, 100% cotton T-shirt material and heated for 30 seconds in the heat press at 175 degrees Celsius at a pressure setting of seven. After cooling, the overlay heat transfer layer paper base layer and release layer were peeled from the fabric, leaving the transferred image and transfer layer attached to the fabric. The result was an imaged fabric having a relatively thick glossy overlay coating that had transferred from the overlay transfer film of the overlay heat transfer paper. The glossy overlay coating was evident even in the background areas where the peelable transfer film had been weeded from the printable, peelable heat transfer material.

Example 2

An overlay heat transfer paper was prepared having a base layer, a release layer overlaying the base layer, and an overlay transfer film overlaying the release layer. The base layer was a cellulosic fiber paper having a basis weight of 86.3 g/m$^2$. The release layer was a mixture of 4.4 parts acrylic latex and 2.6 parts kaolin clay coated on the paper as an aqueous dispersion and dried to a basis weight of 10.2 g/m$^2$. The overlay transfer film was a mixture of 100 parts ethylene acrylic acid copolymer (available as Michem Prime 4983 from Michelman Chemical Co.), and 50 parts of 20,000 molecular weight polyethylene glycol (available as Carbowax 20M from The Dow Chemical Company) coated on the release layer as an aqueous dispersion and dried to a basis weight of 6.8 g/m$^2$.

To test the susceptibility of the overlay heat transfer paper to transfer of the overlay transfer film to background areas where the printable, peelable transfer film had been weeded from the printable, peelable heat transfer material, the overlay heat transfer paper was placed with the overlay transfer film face down on a piece of black, 100% cotton T-shirt material and heated for 30 seconds in a heat press at 175 degrees Celsius. After cooling, the overlay heat transfer paper was peeled from the fabric. The overlay transfer film had transferred to the fabric as a relatively thin glossy overlay coating that. However, the thin glossy overlay coating was easily removed after soaking the fabric in water for a few seconds.

Example 3

The overlay heat transfer paper from Example 2 was prepared as described with the exception that the overlay transfer film was coated on the release layer at a basis weight of 3.4 g/m$^2$. After the completed transfer process as described in Example 2, the resultant fabric had only speckles of the overlay transfer film that transferred from the overlay heat transfer paper. The speckles were easily removed in the first washing of the material.

Example 4

An overlay heat transfer paper was prepared having a base layer, a release layer overlaying the base layer, and an overlay transfer film overlaying the release layer. The base layer was a cellulosic fiber paper having a basis weight of 86.3 g/m$^2$. The release layer was a mixture of 4.4 parts acrylic latex and 2.6 parts kaolin clay coated on the paper as an aqueous dispersion and dried to a basis weight of 10.2 g/m$^2$. The overlay transfer film was a mixture of 100 parts powdered polyethylene wax (available as Micropowders MP 635 G from Micro Powders, Inc. of Tarrytown, N.Y.), 10 parts ethylene acrylic acid copolymer (available as Michem Prime 4983 from Michelman Inc.), 3 parts nonionic surfactant (available as Triton X 100 from The Dow Chemical Company), and 2 parts of polyethylene oxide (available as Polyox N 80 from The Dow Chemical Company) coated on the release layer as an aqueous dispersion and dried. The nonionic surfactant is a dispersant for the powdered polyethylene wax and the polyethylene glycol is a thickener. Three versions of the overlay heat transfer paper were prepared differing only in the basis weights of the overlay transfer film which were 4.1 g/m$^2$, 8.3 g/m$^2$, and 12.4 g/m$^2$.

For samples of each version of the overlay heat transfer paper, a sample of dark T-shirt fabric was prepared according to the transfer process described in Example 2. After the completed transfer process, the resultant fabric had none of the overlay transfer film present when using the versions of the overlay heat transfer papers having 4.1 or 8.3 g/m$^2$ overlay transfer films. The version of the overlay heat transfer paper having a 12.4 g/m$^2$ overlay transfer film resulted in only a trace of overlay transfer film transferring to the resultant fabric.

Example 5

A printable, peelable heat transfer paper as described above in Example 1 was imaged and weeded as additionally described above in Example 1. Samples of an overlay heat transfer paper having an overlay transfer film basis weight of 8.3 g/m$^2$ as described above in Example 2 were prepared for use as an overlay heat transfer material. The weeded image on the printable, peelable heat transfer paper was transferred to the overlay heat transfer paper, and then to a dark T-Shirt fabric according to the transfer processes as described above in Example 1. The resultant fabric had well transferred images coated by the overlay transfer film from the overlay heat transfer paper. Additionally, there was no transfer of the overlay transfer film from the overlay heat transfer paper to the fabric in the weeded background areas. The imaged fabric was washed and dried ten times with laundry detergent in a cold water wash cycle with very good results.

Example 6

A printable, peelable heat transfer paper as described above in Example 1 having a printable, peelable transfer film was imaged with a Canon 700 color copier and weeded as described above in Example 1. Samples of an overlay heat transfer paper as described above in Example 5 were prepared for use as an overlay heat transfer material. The weeded image on the printable, peelable heat transfer paper was transferred to the overlay heat transfer paper, and then to a dark T-Shirt fabric according to the transfer processes as described above in Example 1. The resultant fabric had well transferred images coated by the overlay transfer film from the overlay heat transfer paper. Additionally, there was no transfer of the overlay transfer film from the overlay paper to the fabric in the weeded background areas. The imaged fabric was washed and dried ten times with laundry detergent in a cold-water wash cycle with very good results.

Example 7

A printable, peelable heat transfer paper was prepared having a base layer, a release layer overlaying the base layer, and a printable, peelable transfer film overlaying the release layer. The printable, peelable transfer film included an adhesive layer overlaying the release layer, a flow-resistant opaque layer overlaying the adhesive layer, and an image-compatible layer overlaying the flow-resistant opaque layer. The base layer was a cellulosic fiber paper having a basis weight of 86.3 g/m$^2$. The release layer was a mixture of 3.3 parts acrylic latex and 2.0 parts kaolin clay coated on the paper as an aqueous dispersion and dried to a basis weight of 10.2 g/m$^2$. The adhesive layer was ethylene methacrylic acid copolymer extrusion coated on the release layer at a basis weight of 28.4 g/m$^2$ and ethylene acrylic acid copolymer (available as Primacor 5980-I from The Dow Chemical Company) coextruded at a basis weight of 14.2 g/m$^2$ over the ethylene methacrylic acid copolymer. The flow-resistant opaque layer was a mixture of 3.9 parts titanium dioxide, 0.04 parts polyacrylic acid dispersant (available as Tamol 731 from Rohm and Haas Company), 10.9 parts ethylene acrylic acid copolymer (available as Michem Prime 4983 from Michelman Inc.), 0.2 parts nonionic surfactant (available as Triton X 100 from The Dow Chemical Company), and 0.4 parts aziridine crosslinking agent (available as XAMA 7 from Sybron Chemicals, Inc.) coated on the adhesive layer as an aqueous dispersion and dried to a basis weight of 30 g/m$^2$. The image-compatible layer was a mixture of 0.3 parts nonionic surfactant (available as Triton X 100 from The Dow Chemical Company), 1.7 parts 1,4 cyclohexane dimethanol dibenzoate micronized to about 8 micron average particle size, 3.1 parts ethylene acrylic acid copolymer (available as Michem Prime 4983 from Michelman Inc.), 4.4 parts powdered polyamide (available as Orgasol 3510 EXD from Atofina Chemicals Inc.), 0.4 parts polyamine cationic polymer (available as APC-M1 from Advanced Polymers of Carlstadt, N.J.), 0.2 parts aziridine crosslinking agent (available as XAMA 7 from Sybron Chemicals, Inc.), and 0.2 parts polyethylene oxide (available as Polyox N80 from The Dow Chemical Company) coated on the flow-resistant opaque layer as an aqueous dispersion and dried to a basis weight of 19.5 g/m$^2$.

An overlay heat transfer paper was prepared having a base layer, a conformable layer overlaying the base layer, a release layer overlaying the conformable layer, and an overlay transfer film overlaying the release layer. The base layer was a cellulosic fiber paper having a basis weight of 86.3 g/m$^2$. The conformable layer was ethylene vinyl acetate (available as Elvax 3200 from DuPont) extrusion coated on the base layer at a basis weight of 35.0 g/m$^2$. The release layer was a mixture of 186 parts acrylic latex, 0.2 parts silicone glycol copolymer super wetting agent (available as Dow Q2-5211 from The Dow Chemical Company), 3.7 parts silicone release agent (available as Dow S-190 from The Dow Chemical Company), 18.6 parts of 8,000 molecular weight polyethylene glycol (available as Carbowax 8000 from The Dow Chemical Company), and 11.2 parts aziridine crosslinking agent (available as XAMA 7 from Sybron Chemicals, Inc.) coated on the conformable layer as an aqueous dispersion and dried to a basis weight of 8.2 g/m$^2$. The overlay transfer film was a mixture of 100 parts powdered polyethylene wax (available as Micropowders MP 635 G from Micro Powders, Inc.) dispersed in water with 3 parts nonionic surfactant (available as Triton X 100 from The Dow Chemical Company) at 30% solids, mixed with a mixer, and milled using a colloid mill, and 15 parts ethylene acrylic acid copolymer (available as Michem Prime 4983 from Michelman Inc.) coated on the release layer as a 20% solids aqueous dispersion and dried to a basis weight of about 7.5 g/m$^2$.

The printable, peelable heat transfer paper as described above was imaged and weeded according to the processes as described above in Example 1. The weeded image on the printable, peelable heat transfer paper was transferred to the overlay heat transfer paper described above, and then to a dark T-Shirt fabric according to the transfer processes as described above in Example 1. Removal of the overlay heat transfer paper's base layer and release layer from the transferred image after cooling required less force than did the removal of the overlay heat transfer papers used in Examples 1-6. Due to the easier release, the overlay transfer film occasionally transferred to the imaged printable, peelable heat transfer paper rather than the imaged printable, peelable transfer film transferring to the overlay heat transfer paper. When the transfer was successful, the resultant fabric had well transferred images coated by the overlay transfer film from the overlay heat transfer paper. However, there was transfer of the overlay transfer film from the overlay paper to the fabric in the weeded background areas or at the edges of the imaged areas. The imaged fabric was washed and dried ten times with laundry detergent in a cold water wash cycle with very good results.

Example 8

An overlay heat transfer paper was prepared as described in Example 7 with the exception that the overlay transfer film was a mixture of 100 parts powdered polyethylene wax (dispersed in water with 3 parts nonionic surfactant (available as Triton X 100 from The Dow Chemical Company) at 30% solids, mixed with a mixer, and milled using a colloid mill), 15 parts ethylene acrylic acid copolymer (available as Michem Prime 4983 from Michelman Inc.), and 2 parts silicone release agent coated on the release layer as a 20% solids aqueous dispersion and dried to a basis weight of about 7.5 g/m$^2$.

The printable, peelable heat transfer paper as described above in Example 7 was imaged and weeded according to the processes as described above in Example 1. The weeded image on the printable, peelable heat transfer paper was transferred to the overlay heat transfer paper described above, and then to a dark T-Shirt fabric according to the processes as described above in Example 1. Removal of the overlay heat transfer paper's base layer and release layer from the transferred image after cooling required less force than did the removal of the overlay heat transfer paper used in Example 7. Due to the easier release, the overlay transfer film often transferred to the imaged printable, peelable heat transfer paper rather than the imaged printable, peelable transfer film transferring to the overlay heat transfer paper. However, using other printed samples of the printable, peelable heat transfer paper of Example 7, the printable, peelable transfer film was removed without weeding from the backing layer after imaging, and then placed image side up on the dark shirt material. The overlay heat transfer paper was placed over the printable, peelable transfer film with the overlay transfer film facing the printable, peelable transfer film, followed by heating at 175 degrees Celsius for 30 seconds. After cooling, the overlay backing was removed. The resulting fabric had well transferred images coated by the overlay transfer film from the overlay paper. There was transfer of the overlay transfer film from the overlay heat transfer paper to the fabric at the edges of the imaged areas. The imaged fabric was washed and dried ten times with laundry detergent in a cold-water wash cycle with very good results.

Example 9

An overlay heat transfer paper was prepared as described in Example 7 With the exception that the overlay transfer film was a mixture of 100 parts micronized polypropylene (available as Propyltex 325S from Micro Powders, Inc.) dispersed in water with 3 parts nonionic surfactant (available as Triton X 100 from The Dow Chemical Company) at 30% solids, mixed with a mixer, and milled using a colloid mill, and 15 parts ethylene acrylic acid copolymer (available as Michem Prime 4983 from Michelman Inc.) coated on the release layer as a 20% solids aqueous dispersion and dried to a basis weight of about 7.5 g/m$^2$.

The printable, peelable heat transfer paper as described above in Example 7 was imaged and weeded according to the processes as described above in Example 1. The weeded image on the printable, peelable heat transfer paper was transferred to the overlay heat transfer paper described above, and then to a dark T-Shirt fabric according to the processes as described above in Example 1. Removal of the overlay heat transfer paper's base layer and release layer from the transferred image after cooling required only slightly less force than did removal of the overlay paper used in Example 7. Due to the slightly easier release, the overlay transfer film occasionally transferred to the imaged printable, peelable heat transfer paper rather than the imaged printable, peelable transfer film transferring to the overlay heat transfer paper. However, using other printed samples of the printable, peelable heat transfer paper of Example 7, the printable, peelable transfer film was removed without weeding from the backing layer after imaging, and then placed image side up on the dark shirt material. The overlay heat transfer paper was placed over the printable, peelable transfer film with the overlay transfer film facing the printable, peelable transfer film, followed by heating at 175 degrees Celsius for 30 seconds. After cooling, the overlay backing was removed. The resulting fabric had well transferred images coated by the overlay transfer film from the overlay paper. There was transfer of the overlay transfer film from the overlay heat transfer paper to the fabric at the edges of the imaged areas. The imaged fabric was washed and dried ten times with laundry detergent in a cold-water wash cycle with very good results.

It should be appreciated by those skilled in the art that various modifications or variations can be made in the invention without departing from the scope and spirit of the invention. It is intended that the invention include such modifications and variations as come within the scope of the appended claims and their equivalents.

What is claimed is:

1. A method of applying an image to a substrate, the method comprising:

- providing a first heat transfer material that comprises:
  - a first base layer;
  - a first release layer overlying the first base layer; and
  - a peelable transfer film on which the image is formed, wherein the peelable transfer film comprises an adhesive layer overlying the release layer and a flow-resistant layer overlying the adhesive layer, wherein the flow-resistant layer does not appreciably flow at a transfer temperature;
- providing a second heat transfer material that comprises:
  - a second base layer;
  - a second release layer overlying the second base layer; and
  - an overlay transfer film overlying the second release layer;
- positioning the peelable transfer film between the substrate and the overlay transfer film, wherein the adhesive layer is positioned between the substrate and the flow-resistant layer; and
- applying heat and pressure to transfer the peelable transfer film and the overlay transfer film to the substrate such that the image is transferred to the substrate, wherein the adhesive layer and the overlay transfer film are melt-flowable at the transfer temperature, while the flow-resistant layer is not appreciably melt-flowable at the transfer temperature.

2. The method of claim 1, wherein the first base layer, the second base layer, or both contain a cellulosic web.

3. The method of claim 1, wherein the cellulosic web is latex-impregnated.

4. The method of claim 1, wherein the first release layer, the second release layer, or both comprise a polymer having essentially no tack at a transfer temperature of about 177° C.

5. The method of claim 1, wherein the first release layer, the second release layer, or both comprise a polymer selected from the group consisting of acrylic polymers and poly(vinyl acetate).

6. The method of claim 1, wherein the second heat transfer material further comprises a conformable layer that is positioned between the second base layer and the second release layer.

7. The method of claim 1, wherein heat and pressure are applied by hand ironing.

8. The method of claim 1, wherein heat and pressure are applied using a heat press.

9. The method of claim 1, wherein the overlay transfer film is formed from a different material than the peelable film.

10. The method of claim 1, wherein the overlay transfer film comprises a polymer that melts in a range of from about 65° C. to about 180° C.

11. The method of claim 1, wherein the overlay transfer film comprises a film-forming binder.

12. The method of claim 11, wherein the overlay transfer film further comprises a powdered thermoplastic polymer.

13. The method of claim 1, wherein the adhesive layer has a softening point of less than about 205° C.

14. The method of claim 1, wherein the adhesive layer has a softening point of from about 65° C. to about 150° C.

15. The method of claim 1, wherein the flow-resistant layer comprises a crosslinkable polymer.

16. The method of claim 15, wherein the crosslinkable polymer is selected from the group consisting of acrylic polymers, polyurethanes, and ethylene-acrylic polymers.

17. The method of claim 1, wherein the flow-resistant layer further comprises a crosslinking agent.

18. The method of claim 17, wherein the crosslinking agent is selected from the group consisting of polyfunctional aziridines, epoxy resins, carbodiimide, and oxazoline functional polymers.

19. The method of claim 1, wherein the melt flow index of the flow-resistant layer is less than the melt flow index of the adhesive layer.

20. The method of claim 19, wherein the melt flow index of the flow-resistant layer is less than the melt flow index of the adhesive layer by a factor of at least 10.

21. The method of claim 20, wherein the melt flow index of the flow-resistant layer is less than the melt flow index of the adhesive layer by a factor of at least 1000.

22. The method of claim 1, wherein the flow-resistant layer further comprises an opacifier.

23. The method of claim 1, wherein the peelable film further comprises an image-receptive layer that overlies the flow-resistant layer.

24. The method of claim 23, wherein the image-receptive layer comprises thermoplastic particles, a binder, and a cationic resin.

25. The method of claim 1, wherein the peelable transfer film has a thickness of from about 0.8 to about 3 mils.

26. The method of claim 1, wherein the peelable transfer film has a thickness of from about 1.2 to about 2.5 mils.

27. The method of claim 1, further comprising positioning the first heat transfer material adjacent to the second heat transfer material to form a laminate in which the peelable film is located adjacent to the overlay transfer film.

28. The method of claim 27, further comprising separating the first base layer from the first heat transfer material and thereafter positioning the laminate adjacent to the substrate.

29. The method of claim 1, further comprising separating the first base layer from the first heat transfer material, positioning the peelable film adjacent to the substrate, and thereafter positioning the second heat transfer material so that the overlay transfer film is located adjacent to the peelable film.

30. The method of claim 29, further comprising separating the second base layer from the second heat transfer material.

31. The method of claim 1, wherein the adhesive layer is uncrosslinked.

32. The method of claim 1, wherein the adhesive layer of the peelable transfer film is bonded to the substrate.

33. The method of claim 1, wherein the first heat transfer material further comprises a tie coat layer positioned between the peelable transfer film and the first base layer.

34. The method of claim 1, wherein the transfer temperature is from about 120° C. to about 200° C.

35. The method of claim 1, wherein the transfer temperature is from about 150° C. to about 175° C.

36. A method of applying an image to a substrate, the method comprising:

- providing a first heat transfer material that comprises:
  - a first base layer;
  - a first release layer overlying the first base layer; and
  - a peelable transfer film on which the image is formed, wherein the peelable transfer film comprises an adhesive layer overlying the release layer and a flow-resistant layer overlying the adhesive layer, wherein the flow-resistant layer does not appreciably flow at a transfer temperature;
- providing a second heat transfer material that comprises:
  - a second base layer;
  - a second release layer overlying the second base layer; and
  - an overlay transfer film overlying the second release layer;
- positioning the first heat transfer material adjacent to the second heat transfer material to form a laminate;
- separating the first base layer and the first release layer from the first heat transfer material and thereafter positioning the laminate adjacent to the substrate, wherein the adhesive layer is positioned between the substrate and the flow-resistant layer; and
- applying heat and pressure to transfer the peelable transfer film and the overlay transfer film to the substrate such that the image is transferred to the substrate, wherein the adhesive layer and the overlay transfer film are melt-flowable at a transfer temperature, while the flow-resistant layer is not appreciably melt-flowable at the transfer temperature.

37. The method of claim 36, wherein the overlay transfer film comprises a polymer that melts in a range of from about 65° C. to about 180° C.

38. The method of claim 36, wherein the adhesive layer has a softening point of from about 65° C. to about 150° C.

39. The method of claim 36, wherein the flow-resistant layer comprises a crosslinkable polymer and a crosslinking agent.

40. A method of applying an image to a substrate, the method comprising:

- providing a first heat transfer material that comprises:
  - a first base layer;
  - a first release layer overlying the first base layer; and
  - a peelable transfer film on which the image is formed, wherein the peelable transfer film comprises an adhesive layer overlying the release layer and a flow-resistant layer overlying the adhesive layer, wherein the flow-resistant layer does not appreciably flow at a transfer temperature;
- providing a second heat transfer material that comprises:
  - a second base layer;
  - a second release layer overlying the second base layer; and
  - an overlay transfer film overlying the second release layer;
- separating the first base layer and the first release layer from the first heat transfer material and thereafter positioning the peelable film adjacent to the substrate;
- positioning the second heat transfer material adjacent to the peelable film;

separating the second base layer and the second release layer from the second heat transfer material, wherein the adhesive layer is positioned between the substrate and the flow-resistant layer; and applying heat and pressure to transfer the peelable transfer film and the overlay transfer film to the substrate such that the image is transferred to the substrate, wherein the adhesive layer and the overlay transfer film are melt-flowable at a transfer temperature, while the flow-resistant layer is not appreciably melt-flowable at the transfer temperature.

41. The method of claim 40, wherein the overlay transfer film comprises a polymer that melts in a range of from about 65° C. to about 180° C.

42. The method of claim 40, wherein the adhesive layer has a softening point of from about 65° C. to about 150° C.

43. The method of claim 40, wherein the flow-resistant layer comprises a crosslinkable polymer and a crosslinking agent.

* * * * *